United States Patent
Nakagawa et al.

(10) Patent No.: US 6,791,834 B2
(45) Date of Patent: Sep. 14, 2004

(54) LIQUID COOLING SYSTEM FOR NOTEBOOK COMPUTER

(75) Inventors: Tsuyoshi Nakagawa, Hadano (JP); Yasushi Neho, Atsugi (JP); Tatsuhiko Matsuoka, Ebina (JP); Masahito Suzuki, Toyokawa (JP); Masaaki Eishima, Ebina (JP); Kenichi Nagashima, Ebina (JP); Shinji Matsushita, Ebina (JP); Katsuhiro Arakawa, Zama (JP); Kenichi Saito, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/307,964

(22) Filed: Dec. 3, 2002

(65) Prior Publication Data

US 2003/0081380 A1 May 1, 2003

Related U.S. Application Data

(63) Continuation of application No. 09/796,563, filed on Mar. 2, 2001, now Pat. No. 6,519,147.

(30) Foreign Application Priority Data

Dec. 19, 2000 (JP) ........................................ 2000-385728

(51) Int. Cl.[7] ................................................ H05K 5/20
(52) U.S. Cl. ...................... 361/687; 361/704; 165/80.4; 174/15.1
(58) Field of Search ................................. 361/687–689, 361/698–699, 704; 454/184, 353; 165/80.4; 62/259.2; 174/15.1, 16.1, 16.2

(56) References Cited

U.S. PATENT DOCUMENTS

| | | | |
|---|---|---|---|
| 5,606,341 A | 2/1997 | Aguilera | 345/87 |
| 6,226,178 B1 | 5/2001 | Broder et al. | 361/687 |
| 6,307,746 B1 * | 10/2001 | Beckman | 361/687 |
| 6,313,990 B1 | 11/2001 | Cheon | 361/699 |
| 6,519,147 B2 * | 2/2003 | Nakagawa et al. | 361/687 |
| 2003/0181124 A1 * | 9/2003 | Lee et al. | 445/25 |

FOREIGN PATENT DOCUMENTS

JP      7-142886       6/1995

* cited by examiner

Primary Examiner—Hung Van Duong
(74) Attorney, Agent, or Firm—Mattingly, Stanger & Malur, P.C.

(57) ABSTRACT

In a liquid-cooling system for a notebook personal computer having a body part including a CPU and a chip set respectively mounted on a mother board and an HDD, and a display part rotatably supported by the body part, a heat receiving head is fixed to at least one heat generation part including the CPU. A tube filled with cooling liquid is connected to the heat receiving head. The tube connected to the heat receiving head is disposed in series on at least one heat generation part including the chip set so as to collect the heat generated from each heat generation part. The tube is also laid in a meandering or zigzagging pattern between a liquid crystal panel and a housing of the display part. The heat generated from each heat generation part is absorbed at part of the tube by the cooling liquid that circulates in the tube and functions as a heat transfer medium. The absorbed heat is then radiated at another part of the tube. Consequently, the heat generated from the chip set including the CPU and other heat sources such as the HDD can be radiated together to the outside. Local temperature rising is prevented. An uniform temperature environment is attained on all the surfaces of the body part.

6 Claims, 14 Drawing Sheets

FIG.3
(1)
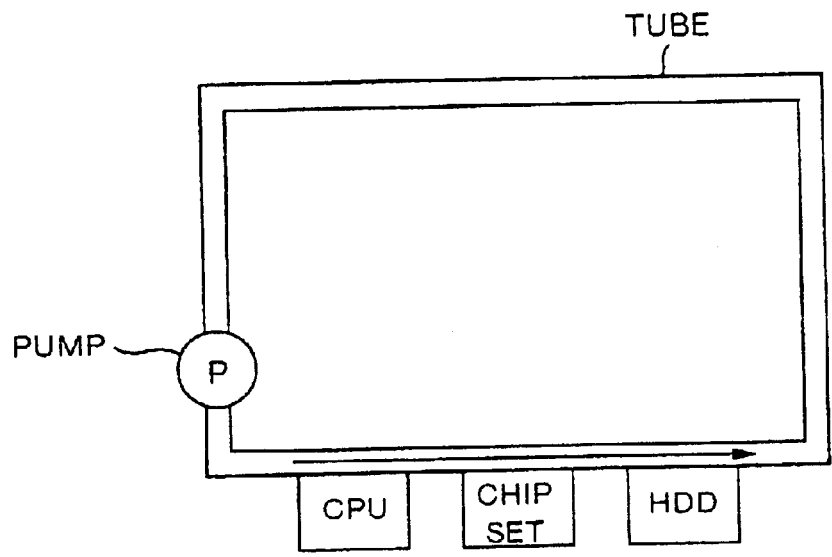
LARGE ← → SMALL
AMOUNT OF
HEAT GENERATION
(2)
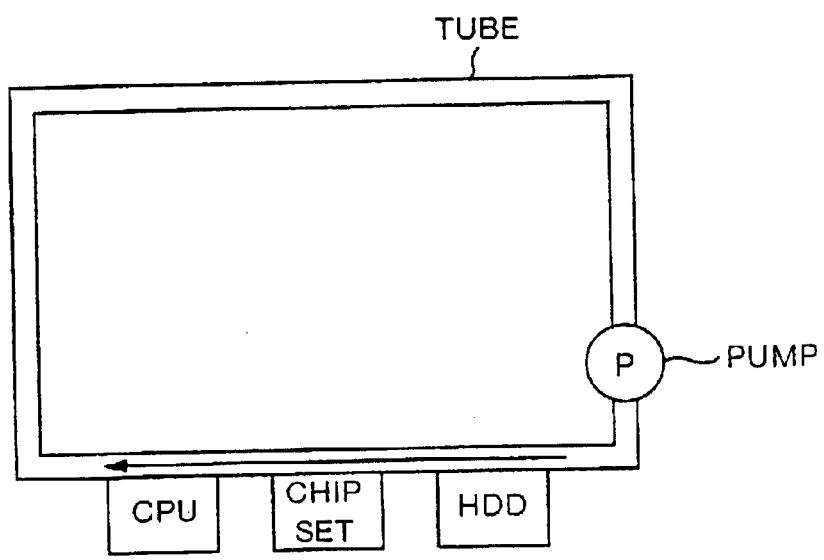
LARGE ← → SMALL
ALLOWABLE UPPER LIMIT
TEMPERATURE

FIG.14
(1)
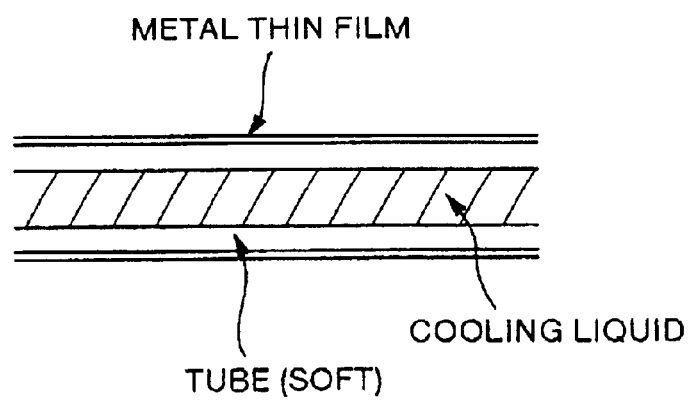
(2)
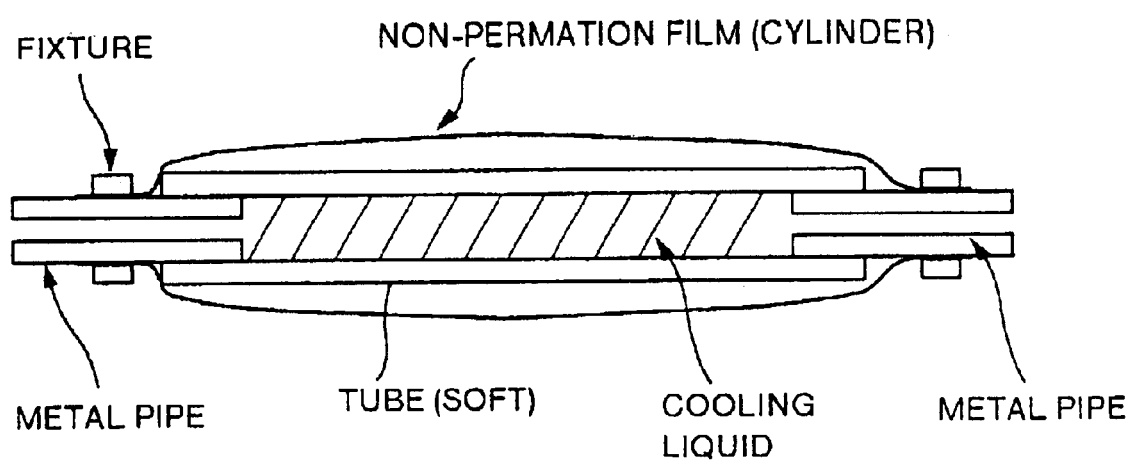

LIQUID COOLING SYSTEM FOR NOTEBOOK COMPUTER

This is a continuation application of U.S. Ser. No. 09/796,563, filed Mar. 2, 2001, now U.S. Pat. No. 6,519,147.

BACKGROUND OF THE INVENTION

The present invention relates to a cooling art and an information processing apparatus. More particularly, the present invention relates to an art that is effective when applied to a cooling art, etc. for space-saving type personal computers, etc.

A conventional art of a cooling system for electronic apparatuses is one to thermally connect a heat generation member in an electronic apparatus with a wall of a metal housing by interposing a metal plate or a heat pipe between the heat generation member and the wall of the metal housing. Consequently, the heat generated from the heat generation member is radiated from the wall of the metal housing.

JP-A-7-142886 specification discloses an art for liquid-cooling a heat generation member of an electronic apparatus. According to the disclosed art, the heat generated from a heat generation member of a semiconductor element in the electronic apparatus is received by a heat receiving head, then cooling liquid in the heat receiving head is transferred to a heat radiating head provided at a metal housing of a display device through a flexible tube. Consequently, the heat generated from the heat generation member of the semiconductor element is radiated to the metal housing effectively from the heat radiating head via the cooling liquid. The specification also discloses another art that uses a heat pipe as the heat transfer device described above. According to this art, the heat generated from the semiconductor element is transferred to one end of the heat pipe via a metal heat receiving plate, then released from the other end of the heat pipe, attached directly to a wall surface of the metal housing, which functions as a heat radiating surface.

There is another conventional art disclosed for a cooling system of a notebook personal computer comprising a body part having such electronic circuits as a keyboard, a CPU and a display part having a liquid crystal display device. According to the conventional art, a heat receiving head receives the heat generated from the CPU and a heat radiating head radiates the heat via cooling liquid (that functions as a heat transfer medium) filled in a silicon-made flexible tube connected to the heat receiving head. The flexible tube is led to the heat radiating head provided at the display part so as to form a circulating flow path of the cooling liquid. A cooling system with a heat receiving head receiving the heat generated from the CPU and a heat radiating head radiating the heat transferred is disclosed.

Concretely, each of the above known arts is a local heat radiating structure by means of a heat radiating head.

A notebook personal computer, which generates a heat from the CPU built in the body part, has a problem that the heat generated from the CPU makes circuit operations unstable. Sometimes, the heat might thermally deform the built-in mechanisms. Especially in recent years, in accompanied with even higher operation frequency of the CPU, an amount of heat generation largely increases. It has been desired to efficiently radiate the largely increased heat outside.

The conventional arts described above have disclosed cooling methods that use a cooling liquid, a heat pipe, etc. respectively for general electronic apparatuses. However, it is a true that, for cooling art of notebook personal computers, only a cooling system has been disclosed in which a heat receiving head collects generated heat and a heat radiating head on the display part locally radiates the heat.

With regard to the largely increased heat generation amount in notebook personal computers, it can be considered to cope with it to provide a fan in the vicinity of the CPU to increase an air blow amount of the fan. This, however, arises other problems that wind sound of the fan becomes a noise and vibration is resulted to cause a problem on usage of the personal computer. Alternatively, it can be considered to enlarge the size of an air cooling heat sink (a heat radiation plate) for heat radiation at the heat generation member such as CPU to enlarge heat radiation capacity. However, this is also incompatible with the demand of notebook computers for down-sizing.

Furthermore, the operation clock speed has been improved for chip sets and display controllers so as to improve the display and memory access performances. As for the HDD, the spindle rotation speed has been improved so as to improve the disk access performance. And, electronic parts have been highly integrated for higher packing density.

SUMMARY OF THE INVENTION

As described above, an amount of heat generation at parts other than the CPU is in the tendency toward increment and cooling has become necessary at a plurality of heat generation parts in the notebook personal computer. It is an object of the present invention to provide a liquid-cooling art that is useful to be employed for notebook personal computers and to propose a structure for providing a specific heat radiation effect which is not provided by the conventional arts. Therefore, in the present invention, the following structures are mainly employed.

A liquid-cooling system for a notebook personal computer of the present invention, comprises: a body part including a CPU and a chip set that are mounted on a mother board respectively and an HDD; and a display part rotatably supported by the body part, wherein a heat receiving head is fixed to at least one heat generation part including the CPU, and a tube filled with cooling liquid is connected to the heat receiving head, and the tube is then laid in a meandering or zigzag pattern between a liquid crystal panel of the display part and a housing of the display part, and the heat generated from the heat generation part is absorbed at a part of the tube and radiated from another part of the tube by using the cooling liquid circulating in the tube as a heat transfer medium.

A liquid-cooling system for a notebook personal computer of the present invention, comprises: a body part including a CPU and a chip set that are mounted on a mother board respectively and an HDD; and a display part rotatably supported by the body part, wherein a heat receiving head is fixed to at least one heat generation part including the CPU, and a tube filled with cooling liquid is connected to the heat receiving head, and the tube connected to the heat receiving head is arranged in series on at least one heat generation part including the chip set to collect the heat from the respective heat generation parts, and the tube is then laid in a meandering or zigzag pattern between a liquid crystal panel of the display part and a housing of the display part, and the heat generated from the heat generation part is absorbed at a part of the tube and radiated from another part of the tube by using the cooling liquid circulating in the tube as a heat transfer medium, A liquid-cooling system for a notebook personal computer of the present invention, comprises: a body part including a CPU and a chip set that are mounted on a mother board respectively and an HDD; and a display part rotatably supported by the body part, wherein a heat receiving head is fixed to at least one heat generation part including the CPU, and a tube filled with cooling liquid is connected into the heat receiving head from a side surface of the head and is extended out of the heat receiving head from an opposite side surface of the head, and the tube is then led through left and right hinges between a liquid crystal panel of the display part and a housing of the display part and is laid in a meandering or zigzag pattern, and the heat generated from the heat generation part is absorbed at a part of the tube and radiated from another part of the tube by using the cooling liquid circulating in the tube as a heat transfer medium.

BRIEF DESCRIPTION OF THE DRAWINGS

FIG. 3 is views showing a relationship between the cooling liquid circulating route and a plurality of heat generation parts of a notebook personal computer according to an embodiment of the present invention;

FIG. 14 is views showing a detailed structure of the tube filled with cooling liquid.

DETAILED DESCRIPTION OF THE PREFERRED EMBODIMENTS

Figure 1:
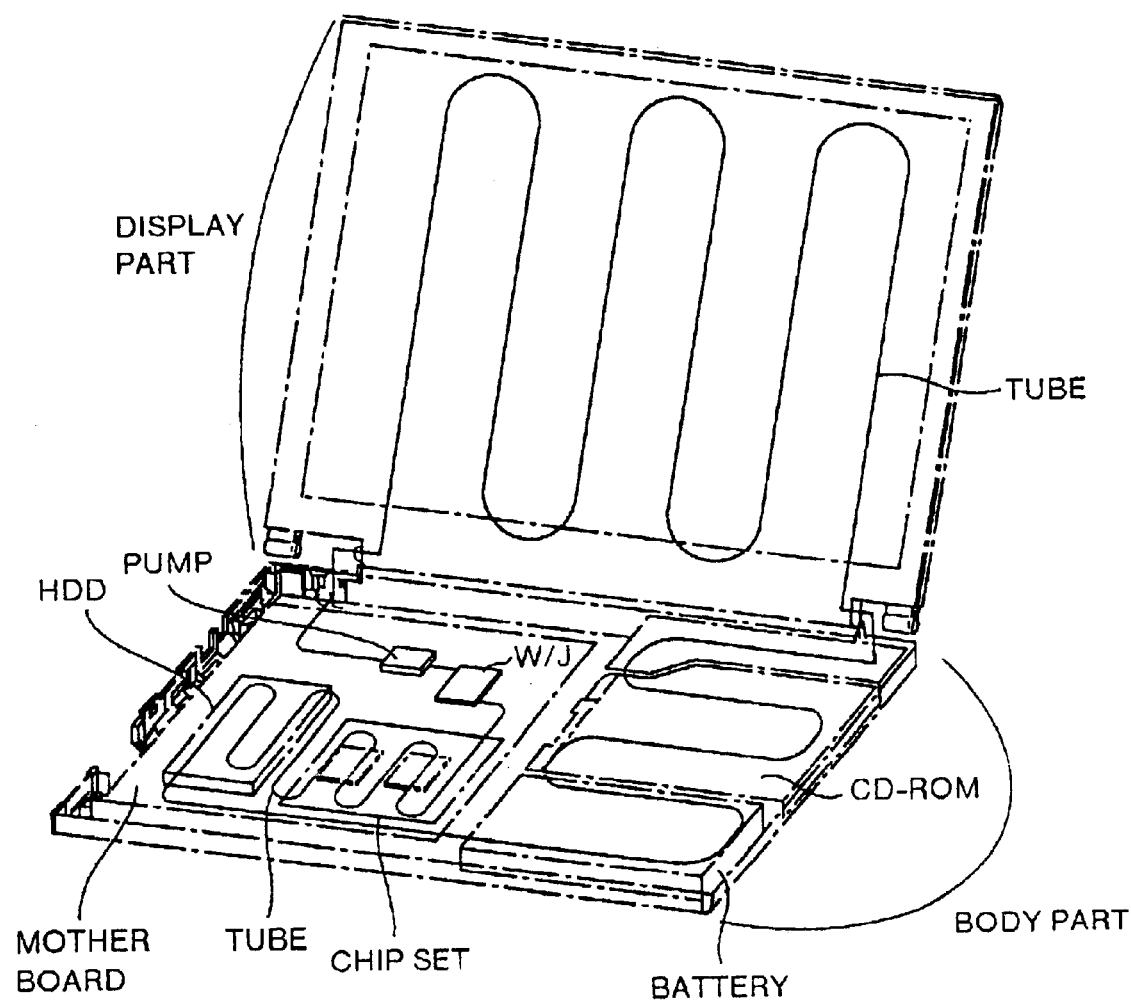
FIG. 1 is a view showing an entire structure of a liquid-cooling system for a notebook personal computer according to an embodiment of the present invention.

FIG. 1 is a view showing an entire structure of a liquid-cooling system for a notebook personal computer according to an embodiment of the present invention. According to FIG. 1, a notebook personal computer is structured by a body part 1 including a keyboard and a display part 2 including a liquid crystal panel rotatably supported by the body part 1. In the body part 1 of the personal computer, arranged is a mother board (controlling circuit board) 3 supported by a housing, etc. Various electric/electronic elements, integrated circuits, electronic circuit groups, etc. necessary for operating the personal computer are mounted on the mother board 3. A CPU 4, an electronic element, for example, a chip set 5 of IC and the like are also mounted on the mother board 3, that become heat generating sources during operation of the personal computer. Further, other heat generating sources such as a HDD (Hard Disk Drive) 6, a battery part 7, and a CD-ROM part 8 are housed in the body part 1. In FIG. 1, the CPU 4 is disposed under a W/J (Water Jacket used as a heat receiving head). The heat generated from the CPU 4 is effectively transferred to the heat receiving head.

In a basic structure of the liquid-cooling system according to an embodiment of the present invention, a heat receiving head (W/J) 10 is fixed on the CPU 4 that is the biggest heat source in the body part 1 of the personal computer so that the heat generated from the CPU 4 is collected by cooling liquid circulating in the heat receiving head. A tube 12 connected to the heat receiving head 10 and filled with cooling liquid is led between a liquid crystal panel of the display part 2 and a front cover through right and left hinges 14 (see FIG. 7) of the display part 2. The heat is radiated from the front cover or the housing. The cooling liquid used in this embodiment may be pure water or water containing ethylene glycol or the like. In this embodiment, the circulating means for circulating the cooling liquid is described as a tube, it is not limited only to the tube.

In FIG. 1, the heat receiving head 10 is provided only for the CPU 4, which is the biggest heat source disposed in the body part 1 of the personal computer. And, for other heat sources such as the chip set 5, the HDD 6, etc., the tube is laid on each of them in a meandering or zigzagging pattern. The present invention does not limit the cooling system structure only to that, however. A heat receiving head may also be disposed on the chip set 5 by taking the size and heat radiating value thereof into consideration. In addition, the tube may be connected thermally to the chip set 5, the HDD 6, etc., for example, with use of a heat transfer member so as to enable the cooling liquid circulating in the tube to absorb the heat.

Furthermore, the tube connected to the heat receiving head and filled with cooling liquid forms a circulating route disposed in a meandering or zigzagging pattern at the rear side (in the structure shown in FIG. 1) of the liquid crystal panel. The tube may be made not only of silicon or rubber, but also of such metals as Al, Mg, Cu, Ti, SUS, etc. or an alloy of them. Especially, the tube made of metal or metal alloy is high in heat radiating efficiency, so that it is suitably disposed at the rear side of the liquid crystal panel. However, the metal or metal alloy tube is not flexible and it is degraded in assembly properties sometimes. In such a case, the metal or metal alloy tube may be combined with a silicon or a rubber flexible tube so as to form a cooling liquid circulating route.

The tube fixed to the housing of the display part at the rear side radiates the heat to the outside through the housing or the front cover in contact with the tube. At this time, the heat radiation is not a local heat radiation by means of heat radiating head as is seen in the prior arts. The heat is radiated from the tube laid on all over the housing surface of the display part. Consequently, the cooling liquid circulating tube must be made of a material whose heat radiating efficiency is high, and the housing of the display part at the rear side and the front cover must also be made of a material whose heat radiating efficiency is high. The housing may be made not only of a metal material, but also of a plastic material whose heat radiating efficiency is high.

As described above, because the tube filled with cooling liquid is disposed in a meandering or zigzagging pattern at the rear side of the display part, the heat generated from the heat generation part is radiated from the rear side of the display part as follows. Usually, the display part is used in an erected state upon usage of the notebook personal computer. The heat radiated from the cooling liquid circulating tube is transferred or conducted to the housing or the front cover and is transferred to the air outside the housing. At this time, because the display part is in an erected state, a rising air current is resulted along the rear side of the display part, so that the heat transfer is more accelerated. Sometimes, the personal computer is operated while the display part is closed. Even in such a case, the heat can be radiated, since the rear side of the display part is in contact with the outside air.

Figure 12:
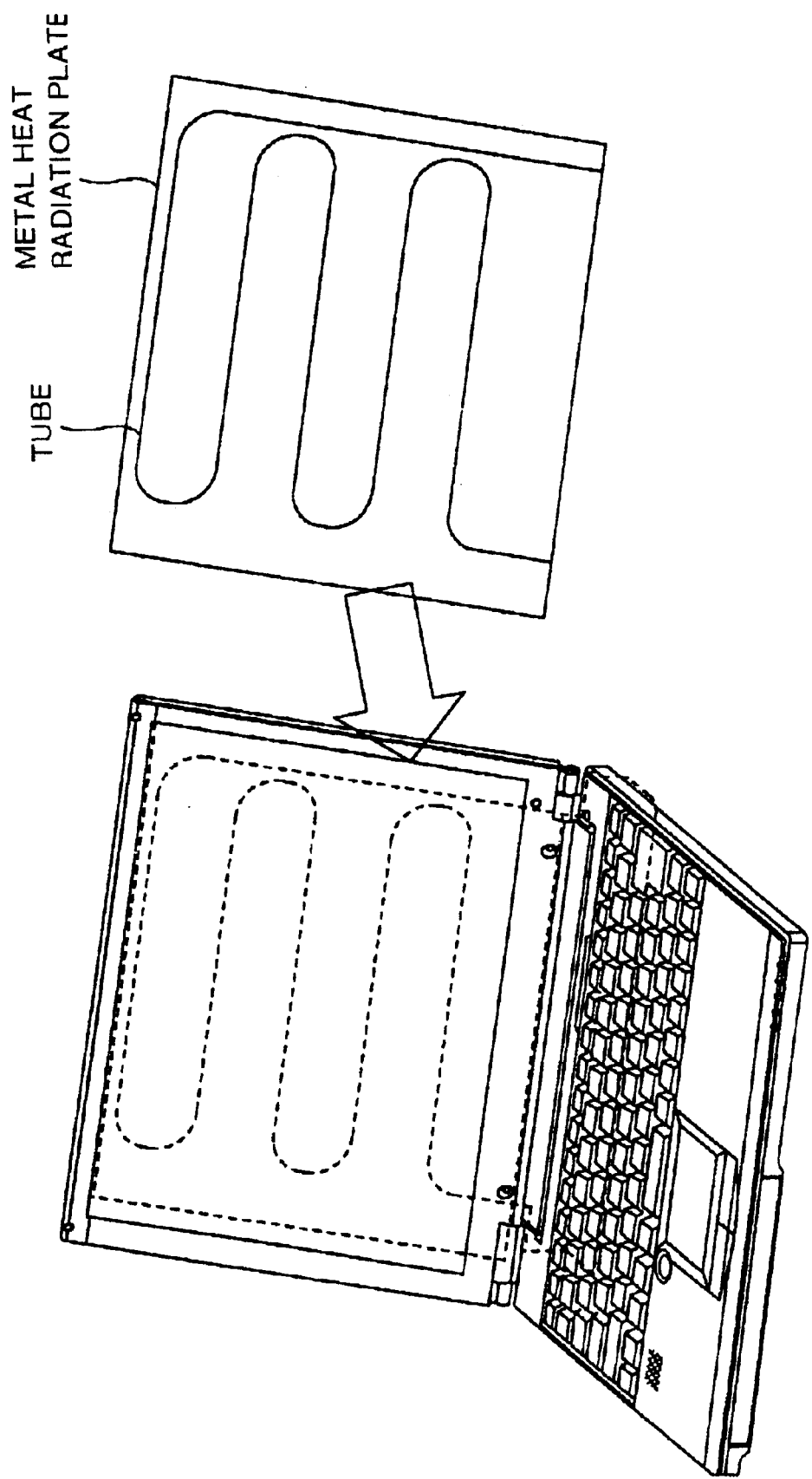
FIG. 12 is a schematic view of a structure in which a heat radiation plate is provided at the rear side of the display part according to an embodiment of the present invention.
Figure 13:
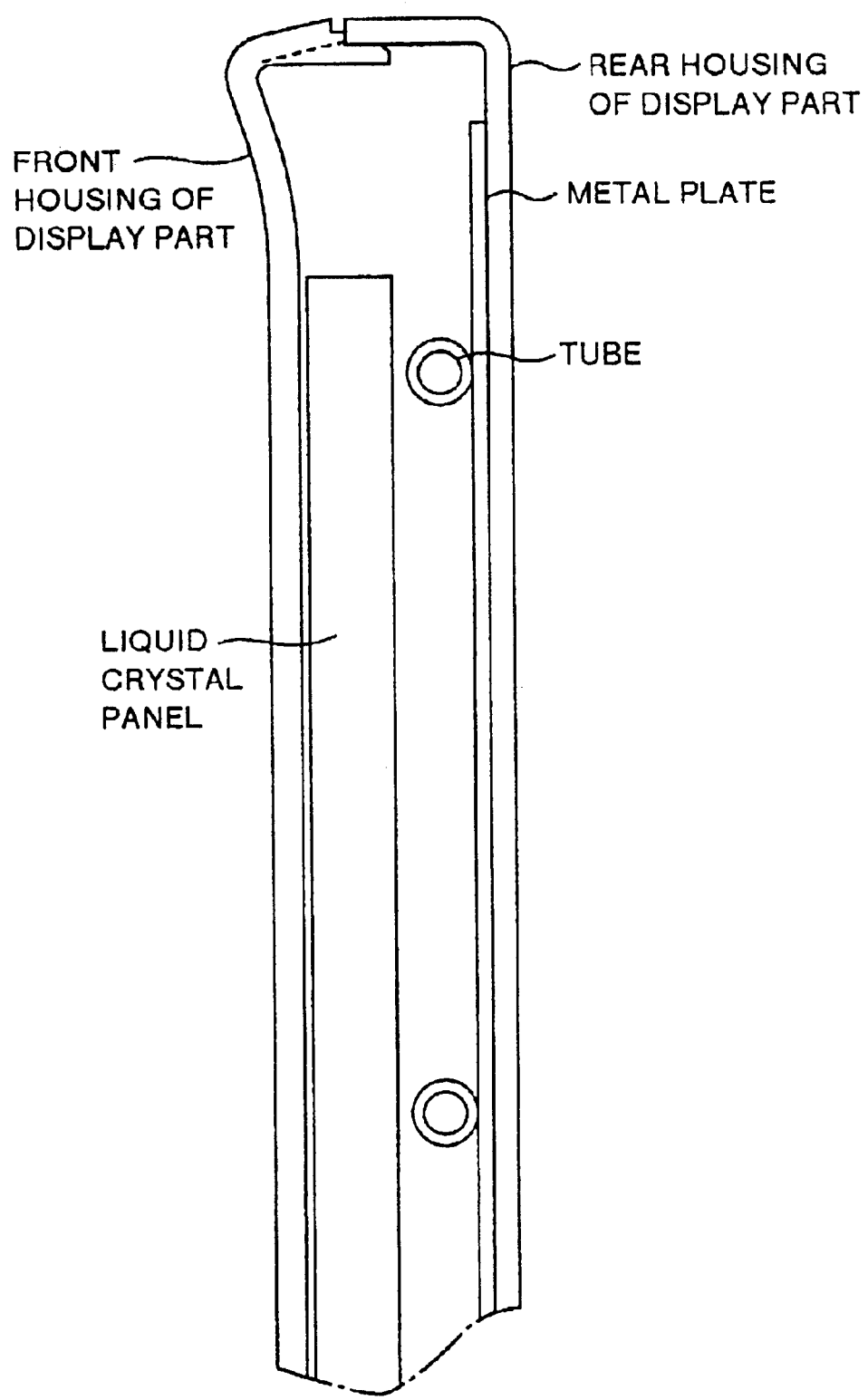
FIG. 13 is a cross sectional view of the structure shown in FIG. 12.

Furthermore, as shown in FIGS. 12 and 13, it is possible to place a heat radiation plate for heat diffusion between the display part and the housing or the front cover, to lay the tube in a meandering or zigzagging pattern and to bring the tube in contact with the heat radiation plate. FIG. 12 is a view showing a general outline of an embodiment in which a heat radiation plate is provided. FIG. 13 is a cross sectional view of the display part 2 in that state. The heat radiation plate 17 for heat diffusion (corresponding to a metal plate in FIG. 13) is placed inside the housing at the rear side of the liquid crystal panel and the tube is disposed in a meandering or zigzagging pattern so as to come in contact with the heat radiation plate. By providing the heat radiation plate, the heat diffusion in the plane direction of the outside of the display part becomes easier. Consequently, the temperature distribution on the housing or the front cover becomes more uniform, thereby the heat radiating efficiency is improved significantly. At this time, in the case where the heat radiation plate is connected thermally to the housing or the front cover, the heat radiating efficiency is improved more significantly.

Further, because the heat radiating efficiency is improved by providing the heat radiation plate, the heat radiating amount per unit length of the tube increases, thereby it is possible to reduce the length of the tube coming in contact with the heat radiation plate. When the tube is reduced in length, the circulating resistance of the cooling liquid in the tube is also reduced, thereby it is possible to reduce the capacity of the pump for the cooling liquid. The personal computer can thus be reduced in both size and power consumption. It goes without saying that the same effect can also be obtained in the case where the heat radiation plate is disposed at the bottom of the housing and the tube is laid on the heat radiation plate.

Figure 2:
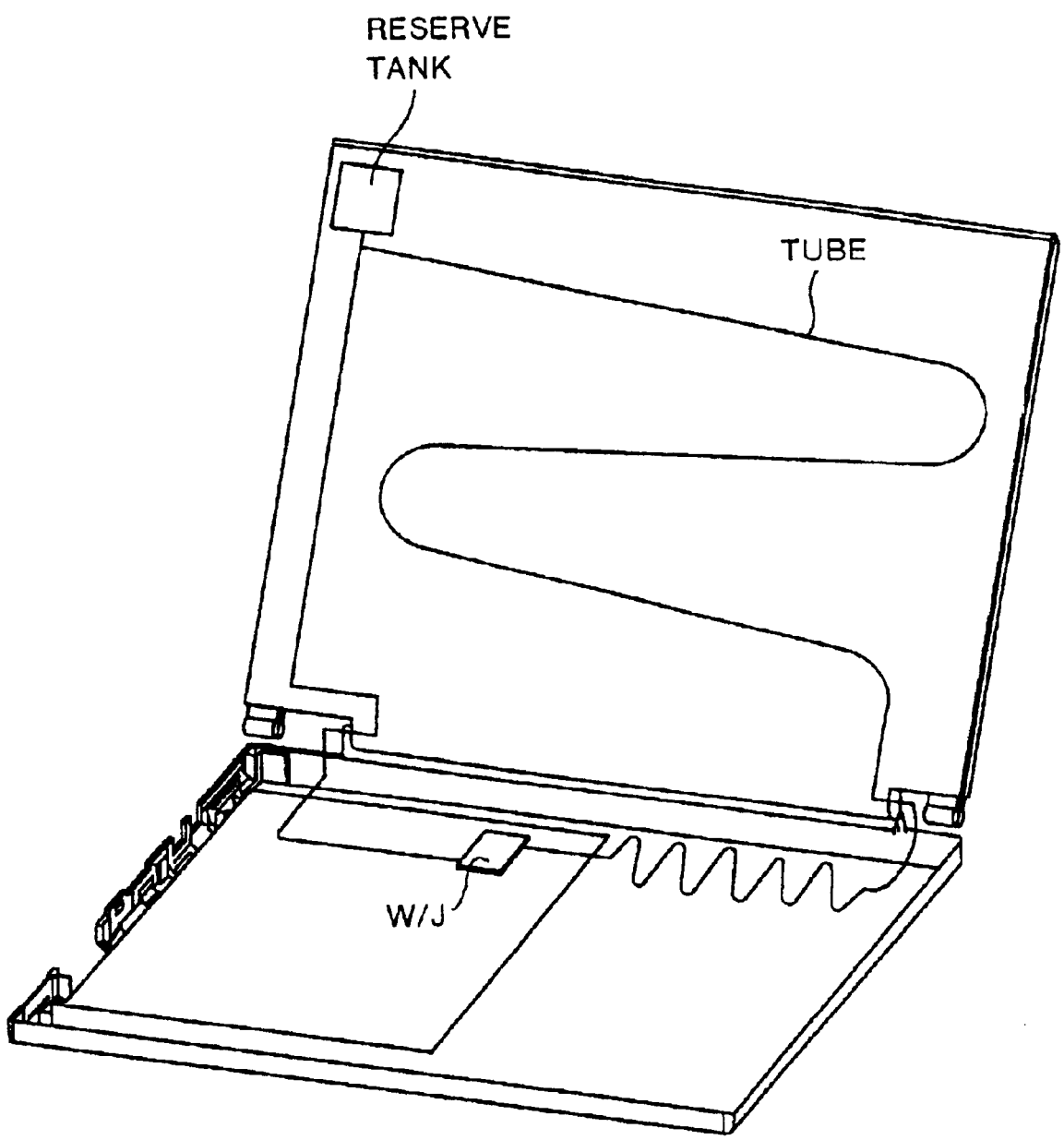
FIG. 2 is a view showing a cooling liquid circulating route of a liquid-cooling for a notebook personal computer according to an embodiment of the present invention.

FIG. 2 shows that the heat radiation can be effected from the bottom of the body part housing in the case where the tube connected to the heat receiving head (W/J) on the CPU 4 is laid in a meandering or zigzagging pattern at the bottom of the body part 1. In FIG. 2, it is shown that the heat is radiated from also the housing of the display part by laying the tube at the rear side of the display part after it passes the bottom of the body part as described above. In this case, the heat generated from the body part is radiated from the bottom of the body part to the desk on which the personal computer is placed, thereby the temperature of the cooling liquid in the tube becomes lower. In this way, by arranging the tube at the bottom of the notebook personal computer and at the rear side of the display part, the heat can be radiated from both top and bottom surfaces of the personal computer, thereby the heat radiating efficiency is improved. While the tube is laid at the bottom of the body part and at the rear side of the display part in the above embodiment, the tube may be laid only at the bottom according to the heat generation amount.

In an embodiment, a heat receiving head is disposed on the CPU 4 that generates much heat as a matter of course. However, such a heat receiving head may also be disposed on each of a plurality of heat generation parts such as the chip set, etc. so as to collect the heat from them. FIG. 3 shows an explanatory view of a heat collecting route in those heat generation parts in such a case.

The arrangement order of the heat generation parts and the cooling liquid flowing direction are decided as follows. In the embodiment shown in FIG. 3, the CPU 4, the chip set 5 and the HDD 6 are heat sources. Generally, the power consumption of each of those components is as follows; CPU 4 . . . 10 to 30W, chip set 5 . . . 2 to 3W, and HDD 6 . . . 1 to 5W. Among those devices, an average power consumption of the HDD is further reduced by save power control at non-access time. On the other hand, the allowable operation temperature of each of those devices is as follows; CPU 4 and chip set 5 . . . 70 to 80° C., HDD 6 . . . 55° C. Taking these operation temperatures into consideration, the cooling liquid is pressurized by the pump 11 and it is circulated in the HDD, the chip set, and the CPU sequentially as shown in FIG. 3(2) in this embodiment. The circulating route decided such way aims to appropriate the cooling liquid of which temperature is lowered by the heat radiation from the bottom of the body part (see FIG. 2) and the rear side of the display part (see FIG. 1) to cool the HDD, because the allowable operation temperature of the HDD is lower than those of other devices. As described above, because the average power consumption of the HDD is low, the cooling liquid that has absorbed the heat generated from the HDD rises low in temperature thereof. There is a difference in temperature between the cooling liquid and the heat generation devices. Therefore, even the tube is then laid on the chip set and the CPU in this order, the cooling liquid can absorb the heat generated from the chip set and the CPU. It is preferable that the pump 11 should be disposed at the downstream of the tube laid at the bottom of the body part and at the rear side of the display part that are located at the upstream of the heat generation part respectively as shown in FIG. 3(1) or FIG. 3(2). In other words, the pump 11 should be disposed at a place in the cooling liquid circulating route, where the temperature becomes the lowest.

In the case where the following condition is satisfied, the cooling liquid may be circulated in the reverse order of that shown in FIG. 3(2), that is, in the order of the CPU, the chip set, and the HDD as shown in FIG. 3(1). In this case, the temperature of the cooling liquid, after having absorbed the heat from the CPU and the chip set, must not exceed the allowable operation temperature of the HDD. Unlike the above embodiment shown in FIG. 3(2), therefore, the heat generated from the CPU can be radiated via the chip set and the HDD. Concretely, the chip set and the HDD can release their heat to the cooling liquid when their power consumption is larger, and they absorb the heat from the cooling liquid when their heat generation amounts become lower in such a power saving mode as the standby/sleep, etc.

Figure 4:
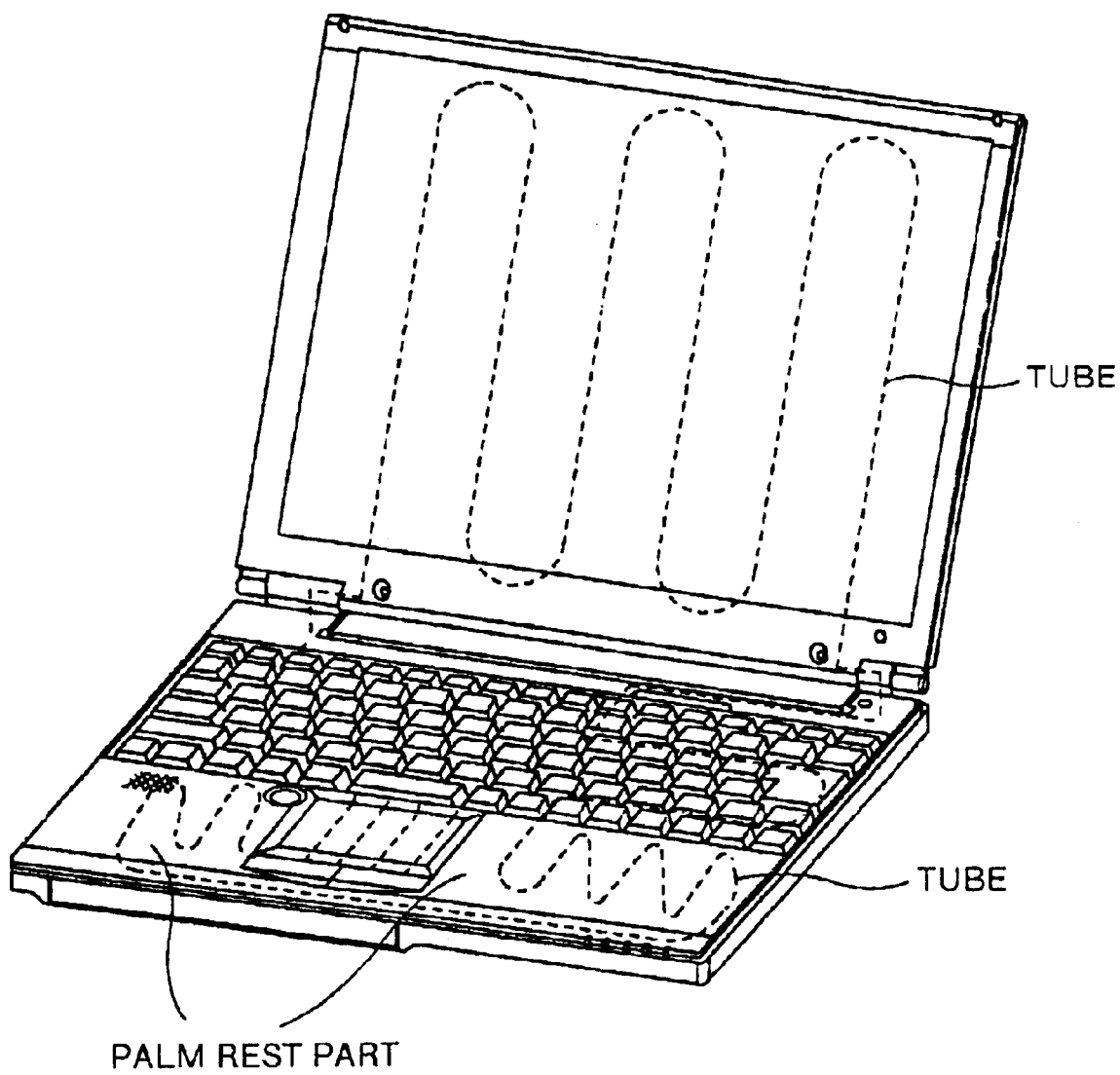
FIG. 4 is a view showing a route for arranging a cooling liquid circulating tube in a notebook personal computer according to an embodiment of the present invention.

FIG. 4 shows a heat absorbing route formed by a metal tube, which is led to a palm rest part. In FIG. 4, a heat generation part, for example, the HDD or the like is disposed in a position in the housing, which corresponds to the palm rest. Therefore, when the surface of the housing under the palm rest is heated by the heat generated from the HDD or the like, hands put on the palm rest might feel hot. In order to avoid this, a tube is laid under the palm rest so as to absorb the heat from the heat generation part located under the palm rest and prevent the temperature on the palm rest from rising.

As described above, in this embodiment, the cooling liquid collects the heat generated from all the heat sources by knowing how much heat is generated from each of them so as to eliminate local high temperature portions from inside the body part so that the temperature of the body part is distributed in uniform, thereby radiating the heat from a wide ranged area of the personal computer.

Figure 5:
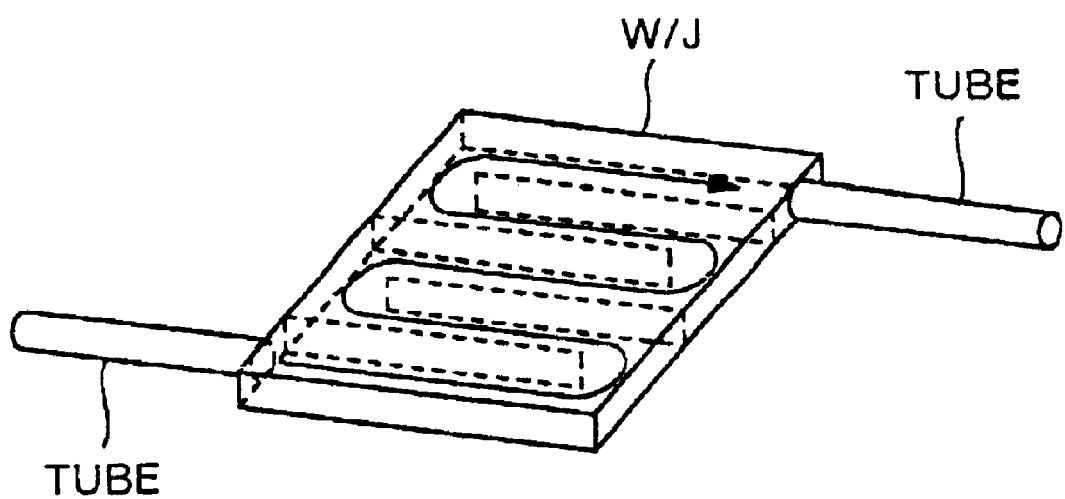
FIG. 5 is a view showing a connection structure of a cooling liquid circulating tube and a heat receiving head according to an embodiment of the present invention.

Next, FIG. 5 shows a structure of a heat receiving head and how a tube in which cooling liquid circulates is laid in the heat receiving head in the liquid-cooling art according to an embodiment of the present invention. Concretely, FIG. 5 shows the heat receiving head to be placed on such a heat generation part as the CPU and both inlet and outlet pipes of the tube connected to the heat receiving head. In order to improve the heat transfer efficiency, the heat receiving head forms a zigzag cooling liquid circulating route so as to make the cooling liquid flow all the subject surfaces. And, in this embodiment, inlet and output pipes of the heat receiving head are disposed symmetrically with an center of the heat receiving head (inlet and outlet ports connected to the heat receiving head are separated from each other at the longest distance therebetween in FIG. 5). In the case where the heat receiving head is square or rectangular in shape, those outlet and inlet pipe joint ports may be provided at any positions on the side surfaces of the heat receiving head, which face each other and there is no need that they should be disposed symmetrically with a point therebetween. In such a case, the cooling liquid circulating route should be decided so as to circulate the liquid in the tube all over the surface of the heat receiving head.

FIG. 14 shows a structure of the cooling liquid circulating tube according to an embodiment of the present invention. In the liquid-cooling system of the present invention, cooling liquid is filled in a tube. In the case where the tube is made of silicon, however, the water content in the cooling liquid might permeate through the tube, thereby the quantity is reduced or air bubbles might enter the tube while the tube is used for a long time. Especially, electronic parts used in a personal computer are low in anti-humidity property, thereby the operating life and reliability of those parts might be degraded due to such the permeated water content. On the other hand, silicon tubes are excellent in flexibility, so that they are assembled easily and low in price. Therefore, permeation of such the water content is prevented as follows. One of such preventive methods is to cover the surface of the subject tube with a film that does not permeate water content. With this structure, it is possible to prevent the water content in the cooling liquid from permeating. Instead of covering the tube with such a non-permeation film, it is also possible to form a metal film or coat such an oil as grease on the surface of the tube. Another method is to cover the tube to which metal pipes are connected with a cylindrical non-permeation film as shown in FIG. 14(2). In this case, although water content of the cooling liquid permeates into a gap between the tube and the non-permeation film, the permeation will be saturated soon, since the area of the gap is very small. The water content permeation can thus be suppressed just to a very small quantity of water. With such structure, it is possible to keep the silicon tube flexibility and to prevent the water content of the cooling liquid from escaping as vapor.

Figure 6:
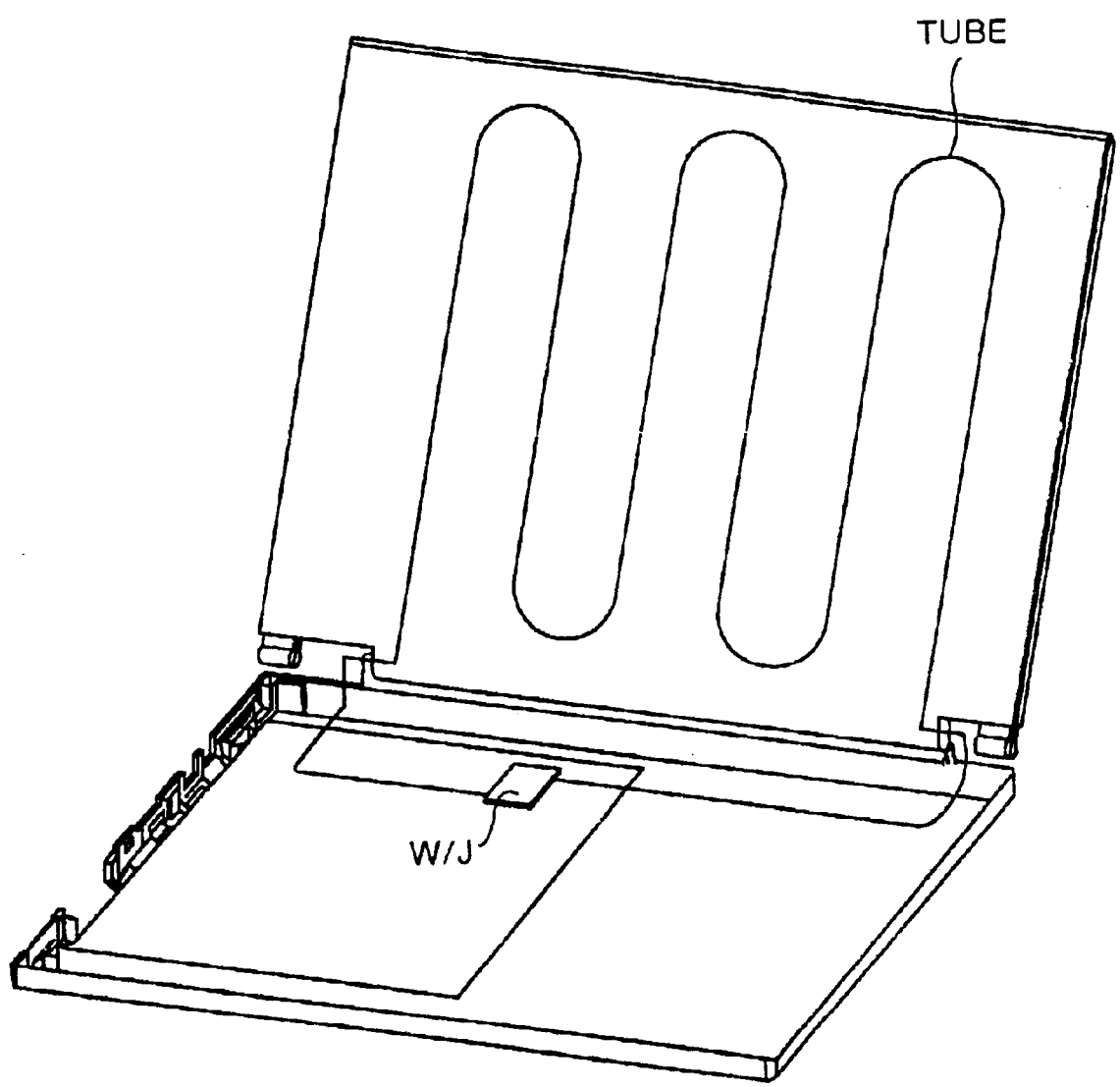
FIG. 6 is a view showing a relationship between a cooling liquid circulating tube and hinges of a liquid crystal display part of a notebook personal computer according to an embodiment of the present invention.

FIG. 6 shows a route of the cooling liquid circulating tube that absorbs the heat from a heat generation part, led to the rear side of the liquid crystal panel of the display part through both right and left hinges (where the display part rotates with respect to the body part of the personal computer) of the display part.

Hereinafter, the features of the structure of the liquid-cooling system in this embodiment as shown in FIGS. 5 and 6 will be described. While inlet and outlet ports of the heat receiving head are disposed on the same side surface in the conventional art, the inlet pipe is not disposed near the output pipe whose temperature rises due to the heat-absorbed cooling liquid in the structure of this embodiment shown in FIG. 5. In other words, the output pipe and the inlet pipe are spaced apart from each other. The cooling liquid in the inlet pipe is therefore not affected by the heat from the outlet pipe while the cooling liquid is fed to the heat receiving head, thereby the thermal conversion is done efficiently in the heat receiving head.

Furthermore, as a matter having technical relationship with regard to sequentially cooling of a plurality of heat generation parts in the body part of the personal computer, which is one of the features of the invention, in this embodiment, employed is the structure that the outlet and the inlet of the tube to the display part of the personal computer are respectively disposed at the hinges. FIG. 6 shows this structure. In the case of the conventional arts described above, which are intended to cool down a single heat generation part, the inlet and outlet ports to the display part of the subject personal computer are disposed together on one side surface of the display part, which is near the heat generation part. This is because such disposition would result an advantage that the total pipe length is reduced. If the single heat generation part (ex., CPU) is disposed in the top left portion of the body part, the input pipe is disposed at the left side of a hinge of the display part and the outlet pipe is disposed at the right side of the hinge, and a space must be secured for the outlet pipe in the body part of the personal computer. And, this might arise a problem of downsizing in personal computers. According to the structure and functions of the conventional art, the inlet and outlet pipes to the heat receiving head are laid on the same side surface and led to one hinge of the display part.

As described above, in the embodiment of the present invention, the arrangement of the inlet and outlet pipes from the heat receiving head becomes a characterizing feature coupled organically with the art for cooling a plurality of heat generation parts continuously.

Figure 7:
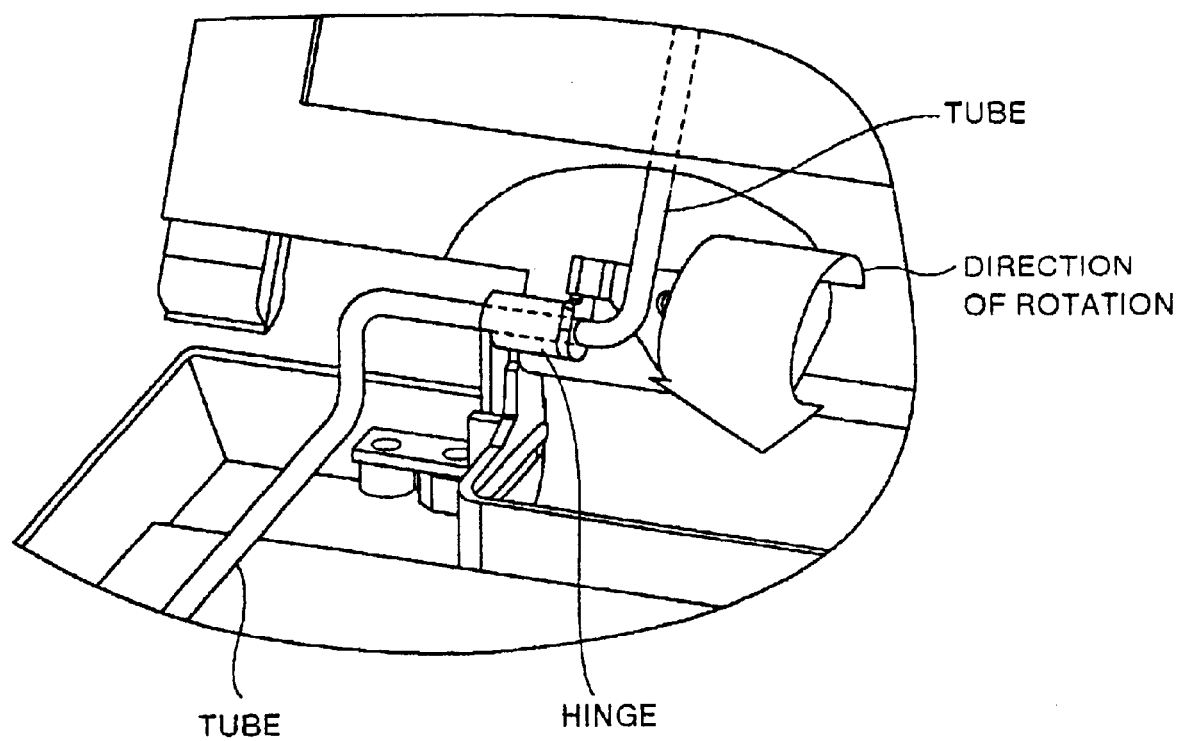
FIG. 7 is a view showing a relationship between hinges of a liquid crystal display part and a tube according to an embodiment of the present invention.
Figure 8:
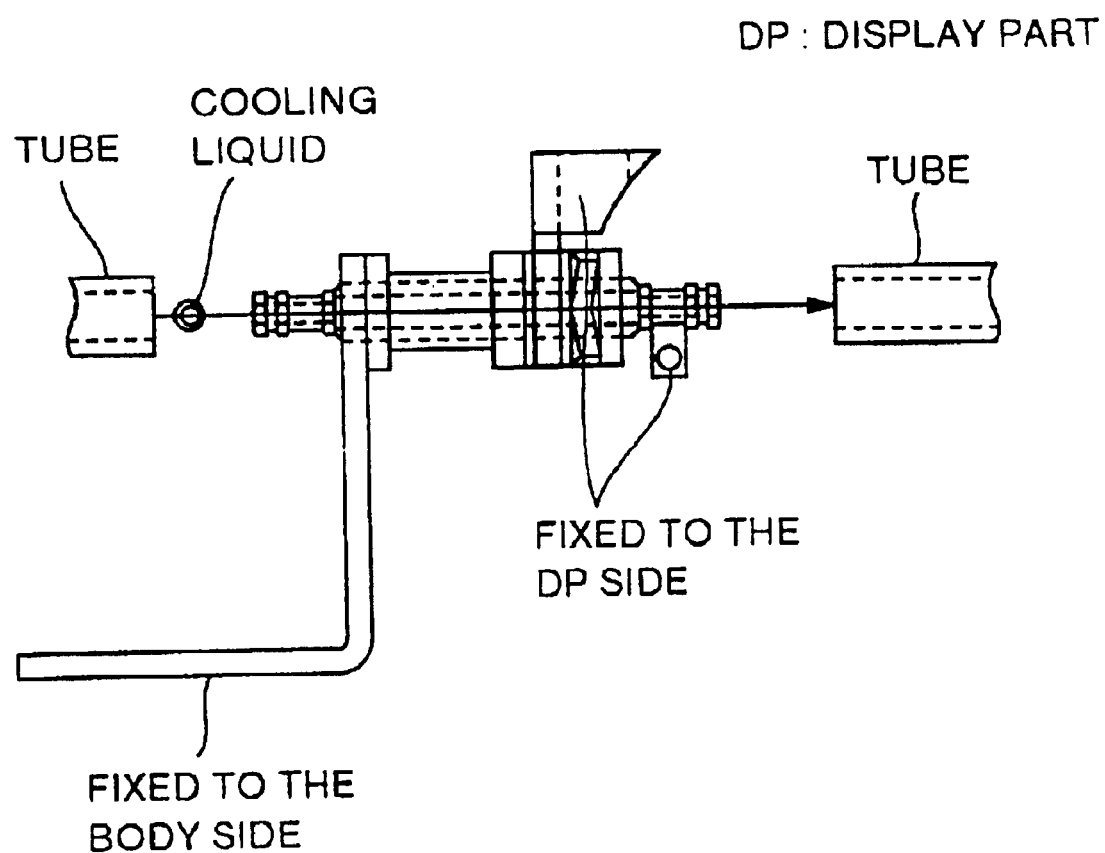
FIG. 8 is a view showing details of the structure shown in FIG. 7.
Figure 9:
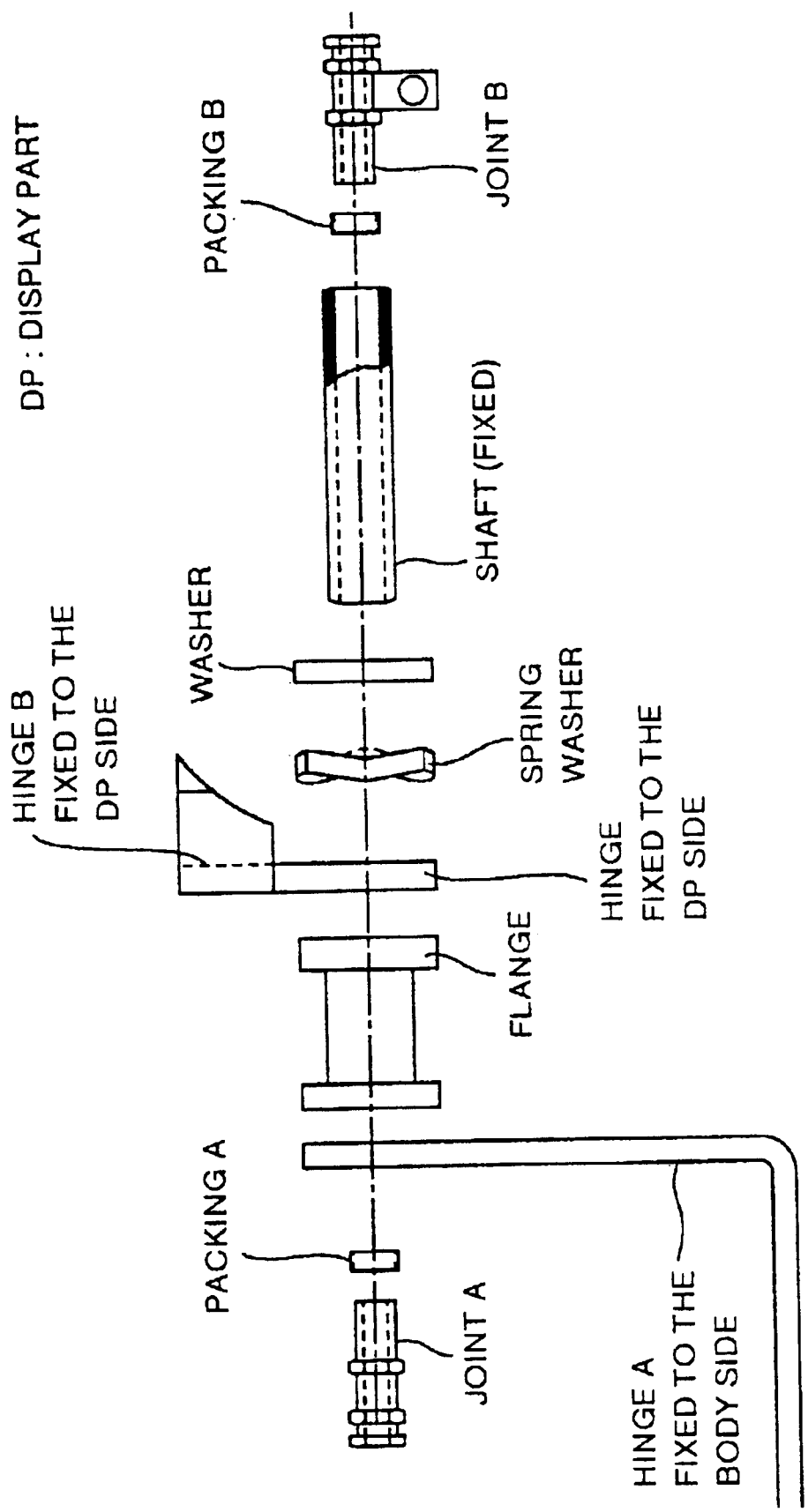
FIG. 9 is an exploded detailed view of a hinge part of a liquid crystal display part.

Next, in FIGS. 7, 8 and 9, relationship between the hinges of the liquid crystal display part and the cooling liquid circulating tube according to an embodiment of the present invention is shown. The liquid crystal display part of the personal computer is provided with a plurality of hinges for rotational movement with respect to the body part of the personal computer and FIG. 7 shows only the left-end hinge. In the liquid-cooling system according to an embodiment of the present invention wherein the tube filled with cooling liquid is laid in the display part so as to radiate the heat at the display part, these hinges are used as part of the tube route. In FIG. 7, shown is a structure in which the hinge is hollow structure and the tube is passed through a hollow portion of the hinge. According to this tube passing structure, application of a rotational load to the tube accompanied with rotational movement of the display part never occur.

FIG. 9 shows a detailed structure of the hinge shown in FIG. 8. Unlike the tube passing structure shown in FIG. 7, FIGS. 8 and 9 show a structure of the hinge to which the tube is fitted. Left and right ends of the hinge are structured by joints A and B, and by means provided between those joints A and B, mechanism for rotational movement is structured. Concretely, the joints A and B do not rotate when the display part rotates, and a hollow structure is formed so that the cooling liquid filled in the tube flows between the joints A and B. As shown in FIG. 8, ends of the tubes are respectively inserted into the joints A and B from right and left of the hinge, and the tubes are suitably fixed to the joints A and B so as to prevent leakage of the cooling liquid. According to the structure shown in FIGS. 8 and 9, when the display part is rotated, the tube is prevented from receiving a rotational load, and the tube is prevented from being rotated together with the display part.

Figure 10:
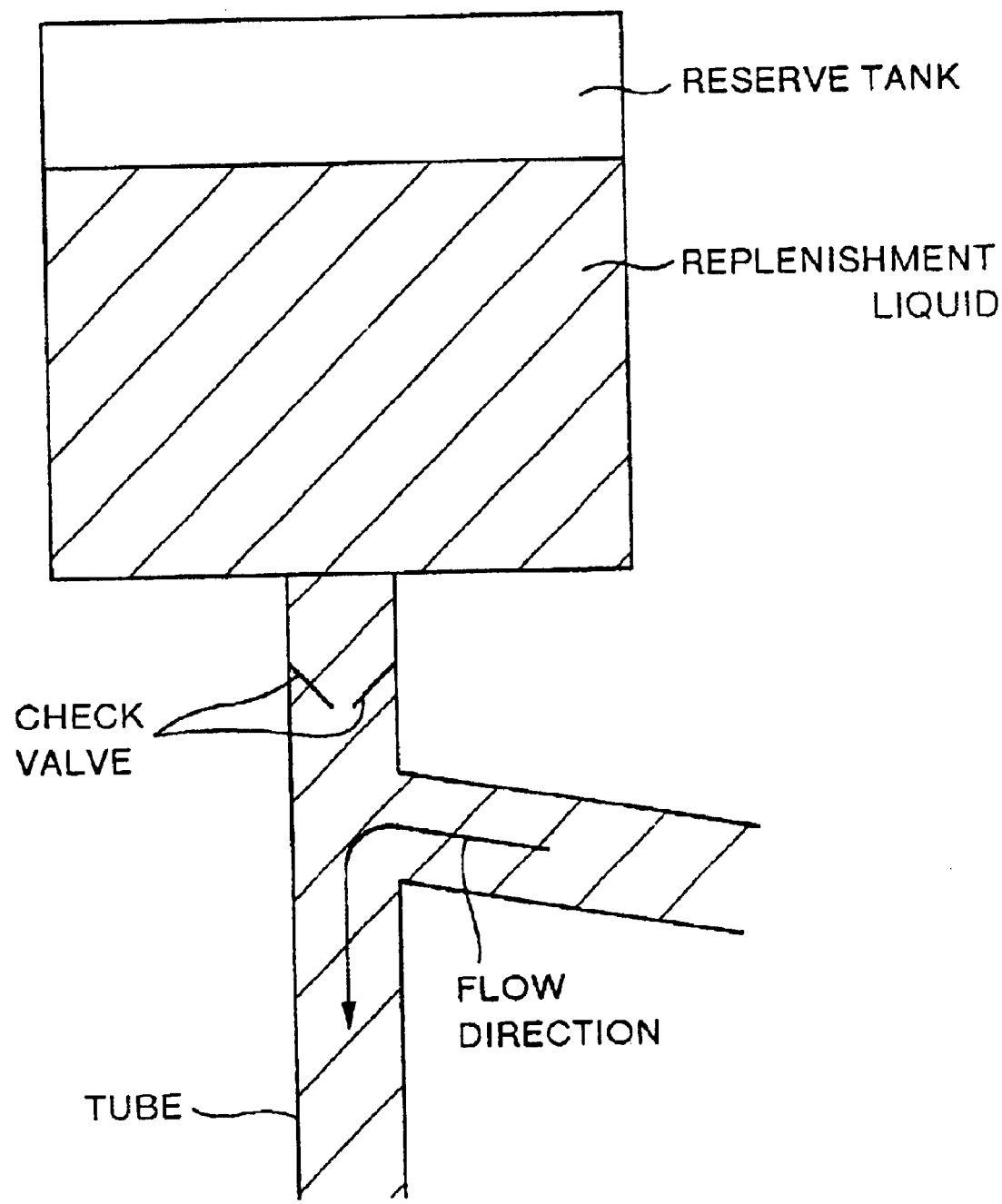
FIG. 10 is a view showing a reserve tank used to replenish a cooling liquid in the tube of an embodiment of the present invention.
Figure 11:
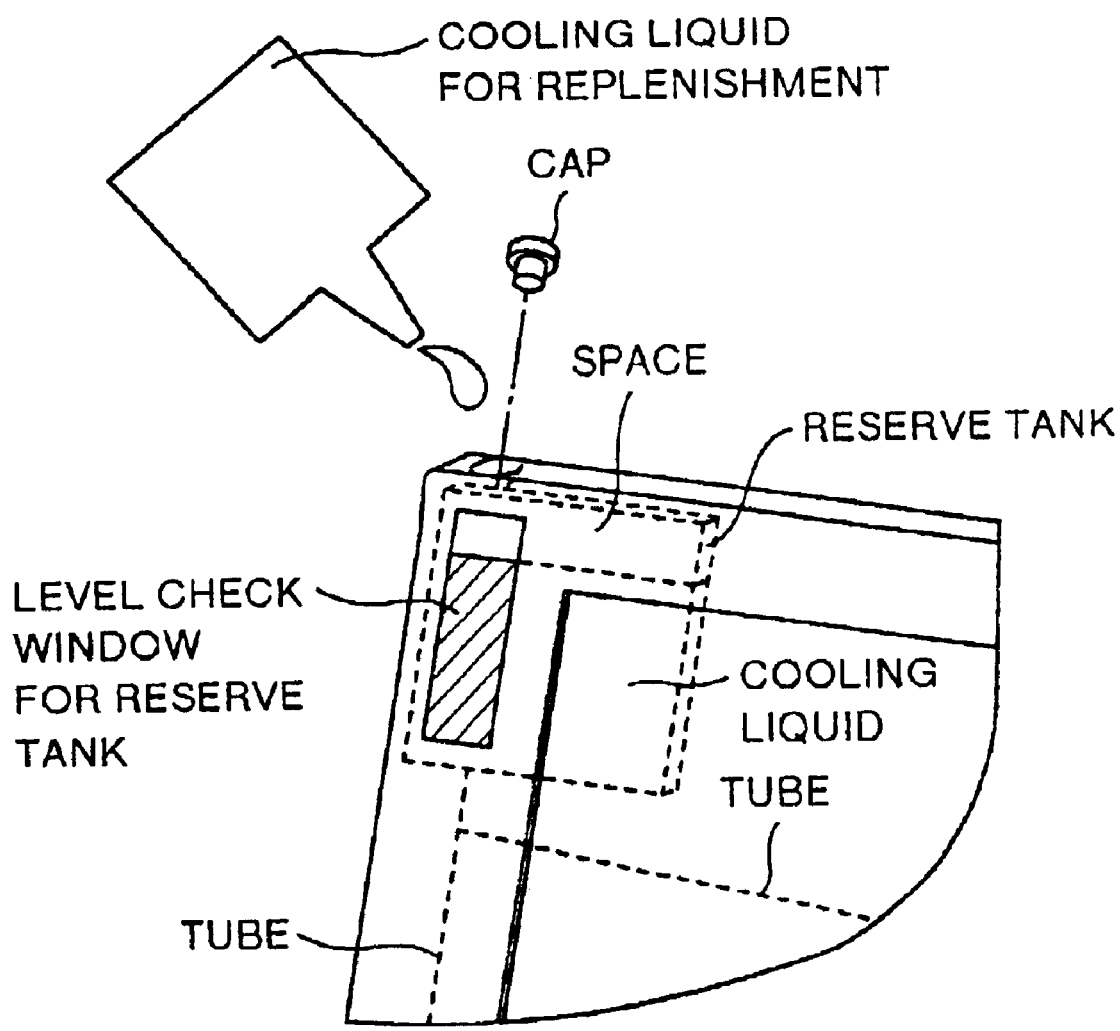
FIG. 11 is a detailed structural view of the reserve tank shown in FIG. 10.

FIGS. 10 and 11 are views showing a configuration and a detailed structure of a reserve tank for replenishing the cooling liquid in the tube according to the embodiment of the present invention. As shown in FIG. 2, the cooling liquid reserve tank is disposed in an upper left corner of the liquid crystal display part and the cooling liquid circulating route of the tube is branched (as shown by an arrow in FIG. 10) to the reserve tank. As shown in FIG. 10, a check valve is provided at a joint between the cooling liquid circulating route and the reserve tank so that replenishment cooling liquid is supplied into the route from the reserve tank while no cooling liquid flows from the route to the reserve tank.

The reserve tank is provided to cope with cases in which the cooling liquid in the tube leaks and the cooling liquid falls short due to evaporation and the like of the cooling liquid, and it keeps replenishment liquid therein and supplies the liquid into the circulating route at any time.

As shown in FIG. 11, upon making up lack of the cooling liquid in the reserve tank from external, a cap of the reserve tank provided at the top is removed to replenish the cooling liquid into the reserve tank while the liquid crystal panel display part is erected. Further, in order to confirm how much amount the cooling liquid is reserved in the reserve tank, the reserve tank is made of a transparent material and a part of the housing corresponding to a reserve tank disposed place is made of a transparent material. With this structure, an amount of the liquid level in the reserve tank can be checked visually from the outside while the liquid crystal display part is erected. Alternatively, other than the above described structure, a bypass path for the reserve tank may be provided as visible detection means of liquid amount so as to check the liquid level visually in the bypass path.

As described above, the liquid-cooling system of the present invention can effectively radiate the heat generated from high heat generation sources such as a CPU, etc. disposed in the body part of a notebook personal computer to the outside, and can radiate the heat generated from heat generation sources such as an HDD and a chip set including the CPU, to the outside, and can achieve a uniform temperature environment all over the surface of the body part.

What is claimed is:

1. A cooling liquid pump for a notebook computer, wherein said cooling liquid pump circularly connects between at least one heat generation part including a CPU and a heat radiation part with a tube and circulates cooling liquid, said cooling liquid pump being connected, at a suction side thereof, to a heat radiation part of said tube in which the cooling liquid circulates and being connected, at a discharge side thereof, to a heat receiving part of said tube in which the cooling liquid circulates.

2. A cooling liquid pump according to claim 1, wherein the discharge side of said cooling liquid pump is connected to a heat receiving part of a CPU, a HDD or a chip set.

3. A cooling liquid pump according to claim 1, wherein a pump capacity of said cooling liquid pump is determined on the basis of a heat radiation amount per unit length of a circular path of the cooling liquid circularly connecting from the discharge side of the cooling liquid pump to the suction side of the cooling liquid pump.

4. A cooling liquid pump according to claim 2, wherein the discharge side of said cooling liquid pump is connected to the heat receiving parts of the CPU, the HDD and the chip set in order.

5. A cooling liquid pump according to claim 2, wherein the discharge side of said cooling liquid pump is connected to the heat receiving parts of the chip set, the HDD and the CPU in order.

6. A cooling system for a notebook computer including a cooling liquid pump, wherein said cooling liquid pump circulates cooling liquid between at least one heat generation part including a CPU and a heat radiation part, and is disposed at a part of a cooling liquid circulating path of which temperature distribution of the cooling liquid is low.

* * * * *